United States Patent
Urakawa

(10) Patent No.: US 8,986,902 B2
(45) Date of Patent: Mar. 24, 2015

(54) FUEL CELL CONSTITUENT PART AND MANUFACTURING METHOD THEREOF

(75) Inventor: Tetsuya Urakawa, Kanagawa-Ken (JP)

(73) Assignee: NOK Corporation, Tokyo (JP)

( * ) Notice: Subject to any disclaimer, the term of this patent is extended or adjusted under 35 U.S.C. 154(b) by 1002 days.

(21) Appl. No.: 12/912,872

(22) Filed: Oct. 27, 2010

(65) Prior Publication Data

US 2011/0104583 A1    May 5, 2011

(30) Foreign Application Priority Data

Oct. 30, 2009  (JP) ................................. 2009-250213

(51) Int. Cl.
*H01M 8/02* (2006.01)
*H01M 8/24* (2006.01)
*B29C 45/14* (2006.01)

(52) U.S. Cl.
CPC ....... B29C 45/14311 (2013.01); H01M 8/0271 (2013.01); H01M 8/0273 (2013.01); *B29C 45/14336* (2013.01); *B29C 2045/14967* (2013.01); H01M 8/0202 (2013.01); H01M 8/0276 (2013.01); H01M 8/0286 (2013.01); H01M 8/241 (2013.01); *Y02E 60/50* (2013.01)
USPC ....................................................... 429/469

(58) Field of Classification Search
CPC   H01M 8/0271; H01M 8/0273; H01M 8/0276
USPC ............................ 429/460, 469, 507, 508, 510
See application file for complete search history.

(56) References Cited

U.S. PATENT DOCUMENTS 7,063,911 B1 *   6/2006  Nagai et al. ................... 429/435
2007/0298310 A1 * 12/2007  Kato ............................... 429/39
2009/0155661 A1 *  6/2009  Morimoto et al. .............. 429/32

FOREIGN PATENT DOCUMENTS

JP        2004245341     *   9/2004
JP        2005-166508 A      6/2005

* cited by examiner

*Primary Examiner* — Ladan Mohaddes
(74) *Attorney, Agent, or Firm* — Daniel J. Sepanik, Esq.; Harness, Dickey & Pierce, P.L.C.

(57) ABSTRACT

A pair of gaskets is integrally formed with seal lips corresponding to each other and extending in the longitudinal direction of the gasket, and side portions disposed on either sides or one side of the seal lip and having a height lower than that of the seal lip. The plate-shaped attachment member includes a through-hole provided at a position where the side portions of the pair of gaskets communicate with each other so as to be formed therethrough in the thickness direction, and the pair of gaskets is integrally formed through the through-hole. An opening shape of the through-hole is set to be an elongated shape in the longitudinal direction of the gasket so as to make a width dimension of each of the side portions as small as possible.

3 Claims, 7 Drawing Sheets

FIG. 5A
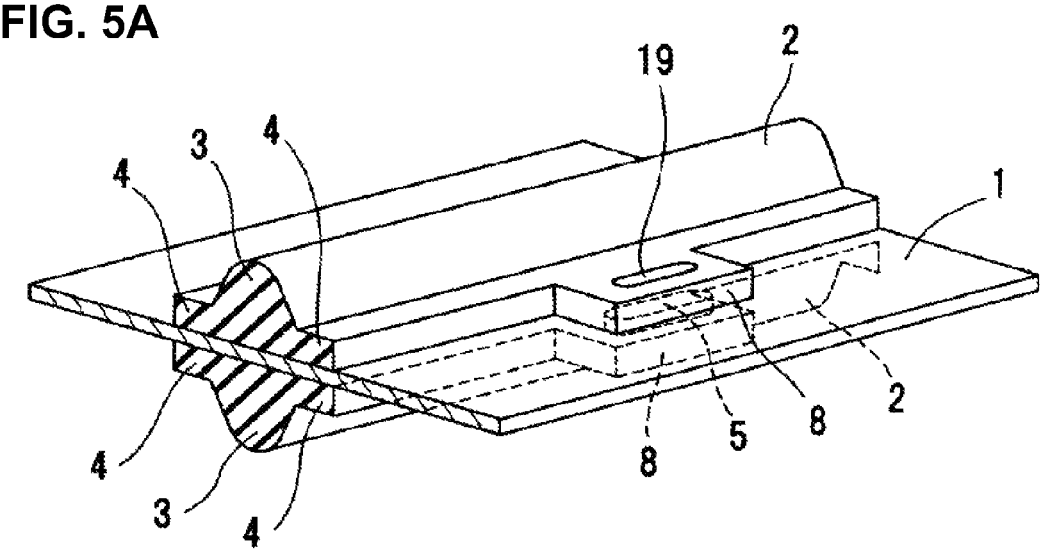
FIG. 5B
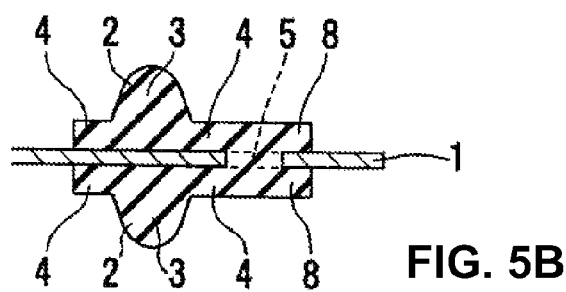
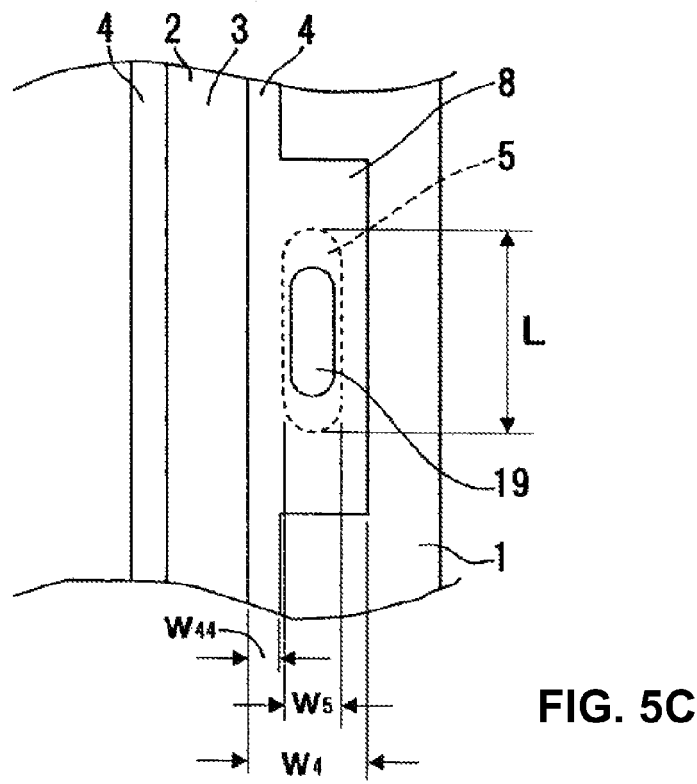
FIG. 5C

FUEL CELL CONSTITUENT PART AND MANUFACTURING METHOD THEREOF

CROSS-REFERENCE TO RELATED APPLICATIONS

This application claims the benefit and priority of Japanese Patent Application No. 2009-250213, filed Oct. 30, 2009. The entire disclosure of the above application is incorporated herein by reference.

FIELD

The present disclosure relates to a fuel cell constituent part and the manufacturing method thereof.

BACKGROUND

This section provides background information related to the present disclosure which is not necessarily prior art.

For example, as shown in FIG. 6, in the matter of gasket 51 comprising the seal in the stack in the solid polymer fuel cell, a multiplicity of embodiments have been invented, wherein the seal was formed from a one-piece mold on the plate-shape attachment part (hereinafter, also merely termed plate) 52 such as separators and MEA (membrane electrode assemblies). (For example, see Patent Reference 1.) For these one-piece molded gaskets 51, space-saving designs are required so that the power generation area 53 on plate 52 can be as broad as possible.

Further, a method has also been proposed, wherein a pair of gaskets 51 is molded at one time on both faces of plate 52, by providing a through-hole at the position directly on top of gasket 51 and the flat face in plate 52 for separators and MEA and the like. For example, in the case of MEA, a pair of gaskets 51 is molded in one piece on the anode side and the cathode side, in the case of separator, on the anode side and the cathode side, on the anode side and the cooling face, on the cathode side and the cooling face.

However, when these through-holes are provided directly under the seal lip, this is not suitable, because shrinkage of gasket 51 from vulcanization, for example, occurs, and adequate surface pressure and reactive force are not obtained. Consequently, as shown in FIG. 7, the through-hole 54 is provided in a section distant from being directly under seal lip 55. In other words, since gasket 51 has as one unit, seal lip 55, extending in the lengthwise direction of the gasket, and side section 56, located on both sides or on one side (both sides in the figure) of seal lip 55 and lower in height to seal lip 55, the through-hole 54 is provided at the position directly on top of the flat face and the side section 56 of the latter. However, in this case, because space is necessary for molding gasket 51 on the through-hole 54 part, when the seal groove for gasket 51 is provided on the partner part for gasket 51 (the part that is face to face with gasket 51 when the stack is tightened, not shown in the figure), the shape must be designed in such a way that the through-hole part 54 fits in the groove. In other words, even when the width w1 of gasket 51 and the width of the groove in which this fits are designed to be at a minimum, the gasket width w2 and the groove width become large in the through-hole 54 part. As a result, it is not possible to respond to the aforementioned space-saving requirements.

Further, in order to solve this problem, it is conceivable to make the through-hole 54 smaller. In other words, the conventional opening shape of the through-hole 54 is circular (true round shape), so it is conceivable that the diameter can be made smaller. Nevertheless, when through-hole 54 is made smaller in this way, the molding material cannot fill the entirety of the opposite face (toward the gate side) of plate 52 by one-time injection molding. It is believed that there are contributing effects of pressure loss and such at the time of passage of the molding material through the through-hole 54. Furthermore, when the input gate for the molding material for the metal mold (injection gate for rubber molding) is located on the flat face directly on top of the small through-hole 54, there is concern for deformation of the through-hole 54 part on plate 52 from the effects of the injection pressure.

Patent Reference 1: Japanese Patent Disclosure, Kokai 2005-166508A

SUMMARY

This section provides a general summary of the disclosure, and is not a comprehensive disclosure of its full scope or all of its features.

The present invention, in consideration of the above points, has the purpose of providing a fuel cell constituent part and manufacturing method thereof, wherein the fuel cell constituent part has a pair of gaskets on both faces of the plate attachment part and through-holes are provided on the plate attachment part to mold the pair of gaskets in one piece, the width of the gaskets can be made as small as possible, consequently, it is possible to respond to the space-saving requirements cited above at the beginning. A further purpose is to provide a manufacturing method for the fuel cell constituent part, wherein plate deformation from the effects of injection pressure can be suppressed by maintaining the opening area of the input gate in the metal mold.

In order to achieve the aforementioned purpose, the fuel cell constituent part is characterized as having a plate attachment part and a pair of gaskets molded in one piece on both faces of the aforementioned plate attachment part; the aforementioned pair of gaskets mutually face each other and are integrated with the seal lip that extends in the lengthwise direction of the gasket, and the side section that is located on both sides or on one side of the aforementioned seal lip and at the same time is lower in height to the aforementioned seal lip; the aforementioned plate attachment part has a through-hole that penetrates in the thickness direction at the position where the side section members of the aforementioned pair of gaskets connect through; the aforementioned pair of gaskets are mutually molded in one piece through the aforementioned through-hole; the opening shape of the aforementioned through-hole is provided as a long shape in the lengthwise direction of the gasket so that the width of the aforementioned side section can be made as small as possible.

Further, the fuel cell constituent part is characterized in that in the aforementioned fuel cell constituent part, the side section of the aforementioned gasket, a groove depression that extends in the lengthwise direction of the gasket is provided on the flat face.

Further, the fuel cell constituent part is characterized in that in the aforementioned fuel cell constituent part in one section in the lengthwise direction of the gasket, a tongue-shape width expansion section is provided that expands the width of the aforementioned side section; the aforementioned through-holes are located at positions directly on top of the aforementioned width expansion section and the flat face.

Furthermore, the manufacturing method for the fuel cell constituent part comprises the manufacturing method for the fuel cell constituent part described, and is characterized in that the aforementioned gaskets are molded by injection molding in a metal mold; the aforementioned metal mold has space for setting the aforementioned plate attachment part, and space for molding one of the aforementioned gaskets, and space for molding the other of the aforementioned gaskets, and the input gate for molding material that opens into the space for molding the aforementioned one of the gaskets; the aforementioned input gate is located at a position directly on top of the through-hole in the aforementioned plate attachment part in the set state and the flat face; moreover, the opening shape of the aforementioned input gate, as with the aforementioned through-hole, is provided in a long shape in the lengthwise direction of the gasket; the aforementioned metal mold is used to mold the aforementioned gaskets.

The opening shape of the conventional through-hole is circular; in contrast to this, when the opening shape of the through-hole, maintaining its opening area, is provided in a long shape in the lengthwise direction of the gasket, it becomes possible to make the width small in the side section of the gasket provided in the position on top of this and the flat face.

In other words, the conventional opening shape of the through-hole is circular; the width of the side section of the gasket provided at the position on top of this and the flat face needs to be set so that it is larger than the through-hole diameter. In contrast to this, in the present invention, because the opening area of the through-hole was maintained when the opening shape of the through-hole was provided in a long shape in the lengthwise direction of the gasket, the width of the gasket side section provided at the position on top of this and the flat face can be made small. As the long shape in the lengthwise direction of the gasket, oblong shapes and elliptical shapes (oval shapes) can be listed; however, from the standpoint of actualizing the stress dispersion in the periphery of the opening, elliptical shapes (oval shapes) are most suitable.

Further, the side section for the gasket is generally flat in shape, but from the standpoint of adequately maintaining an escape section at the time of seal lip compression, it is also satisfactory to have a groove depression that extends in the lengthwise direction of the gasket.

Further, in one section in the lengthwise direction of the gasket in the side section, it is satisfactory to provide a tongue-shaped width expansion section to expand the width of the side section, and locate the through-holes in the positions where this width expansion section and the flat face are on top of each other. Then, as mentioned above, because the opening shape of the through-hole is set in a long shape in the lengthwise direction of the gasket, it becomes possible to make the width of the side section containing the width expansion section smaller than what it was heretofore.

Further, when the opening shape of the through-hole, as described above, is set in a long shape in the lengthwise direction of the gasket, one section of the opening shape of the input gate is crowded out from the opening shape of the through-hole when the opening shape of the input gate for the metal mold, located in the position on top of this and the flat face, remains circular. There is concern that the periphery section of the through-hole becomes deformed from the effects of the injection pressure. In contrast to this, in the manufacturing method of the present invention, the input gate for the metal mold is located in the position directly on top of the through-hole in the plate attachment part in the set state and the flat face. Moreover, because the opening shape of the input gate, as with the through-hole, is set in a long shape in the lengthwise direction of the gasket, the opening shape of the input gate is not crowded out from the opening shape of the through-hole. Consequently, it becomes possible to suppress the deformation of the through-hole periphery section from the effects of the injection pressure by maintaining the opening area of the input gate in the metal mold. As a representative example of the long shape in the lengthwise direction of the gasket, as with the through-hole, the elliptical shape (oval shape) can be listed.

The present invention has the following effects.

In other words, as described above, the opening shape of the conventional through-hole is circular. In contrast to this, by maintaining the opening area and setting the opening shape of the through-hole as a long shape in the lengthwise direction of the gasket, it becomes possible to make the width small in the side section of the gasket provided at the position directly on top of this and the flat face. Consequently, the width of the entire gasket can be made small; it becomes possible to respond to the space-saving requirements of the aforementioned gasket.

Further, in the manufacturing method of the present invention, because the opening shape of the input gate is not crowded out from the opening shape of the through-hole, it becomes possible to suppress the deformation of the through-hole periphery section of the plate from the effects of injection pressure by maintaining the opening area of the input gate in the metal mold.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 5A is a perspective view of the fuel cell constituent part relating to the Third Practical Example of the present invention;

FIG. 5B is a cross-sectional view of the essential sections of the constituent part shown in FIG. 5A;

FIG. 5C is a top view of the essential sections of the fuel cell constituent part shown in FIG. 5A;

Corresponding reference numerals indicate corresponding parts throughout the several views of the drawings.

DETAILED DESCRIPTION

Example embodiments will now be described more fully with reference to the accompanying drawings.

The following practical modes are contained in the present invention.

(1) The fuel cell gasket is characterized in that in the one-piece plate seal formed by integrating the gaskets on both faces in plates such as separators and end plates comprising the fuel cell, the through-hole in the plate and the injection-molding gate for the gasket are oval-shaped.

(2) A circular shape is usually considered when a through-hole is provided on a plate. Then, for the reasons, for example, that the molded gasket is set firmly on the top and bottom faces of the plate, and the sealing properties must be very reliable, the plate through-hole must be covered completely by the gasket. Consequently, the gasket width is very much controlled by this through-hole part. In other words, in order to make the seal width small, it is necessary to find out how to make the gasket width in the through-hole section small. When this through-hole is circular in shape, $\phi \geq 0.5$, preferably $\phi \geq 0.8$. The through-holes are arranged, with spaces between them, so that the rubber material fills the cavities on both faces at the time of molding. Then the injection gate is placed directly on top of the through-hole so that the plate is not deformed by the effects of the injection pressure, and additionally, so that the cavity faces on the side opposite the gate section are filled quickly. Consequently, it is necessary to have the gate diameter smaller than the through-hole diameter so that plate deformation from injection does not occur. There are techniques available to make the gasket width smaller by making this through-hole and the injection gate smaller. However, when the molding properties of rubber are considered, although it also depends on the materials, it is necessary in the case of the circular shape to have the diameter of the injection gate $\phi \geq 0.3$, preferably $\phi \geq 0.4$. Here, to solve these problems, the oval shape that is used does not decrease the opening area of the through-hole in this plate. By having the oval shape along the seal line of the gasket, the gasket part of the through-hole can be designed to be small. Furthermore, the injection gate also has an oval shape similar to that of the through-hole, and has a shape about the same size as the through-hole, or somewhat smaller. The gasket can be made compact by the above means.

(3) By forming the through-hole in the plate as an oval opening along the seal line, the width of the gasket can be designed to be small; as the result, space-saving in the stack and increase in the power generation area can be anticipated. Furthermore, by forming the injection gate similarly as an oval, plate deformation can be suppressed.

Next, Practical Examples of the present invention are explained according to the figures.

Figure 1A:
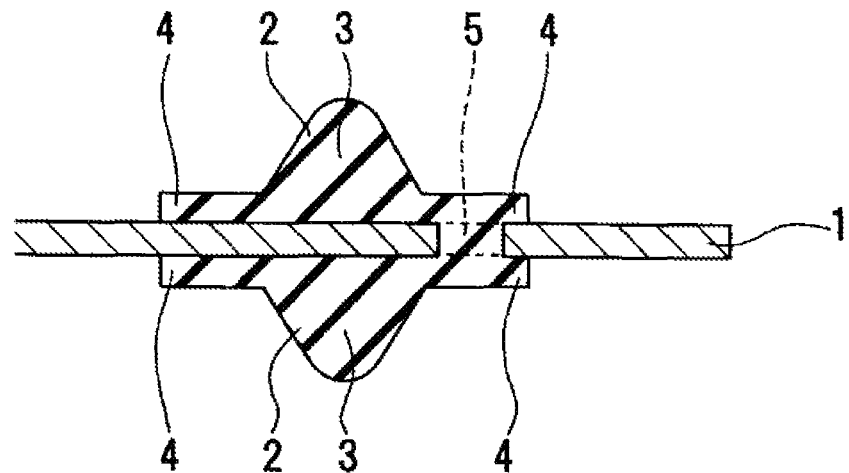
FIG. 1A shows a cross-sectional view of a section of the fuel cell constituent part relating to the First Practical Example of the present invention.
Figure 1B:
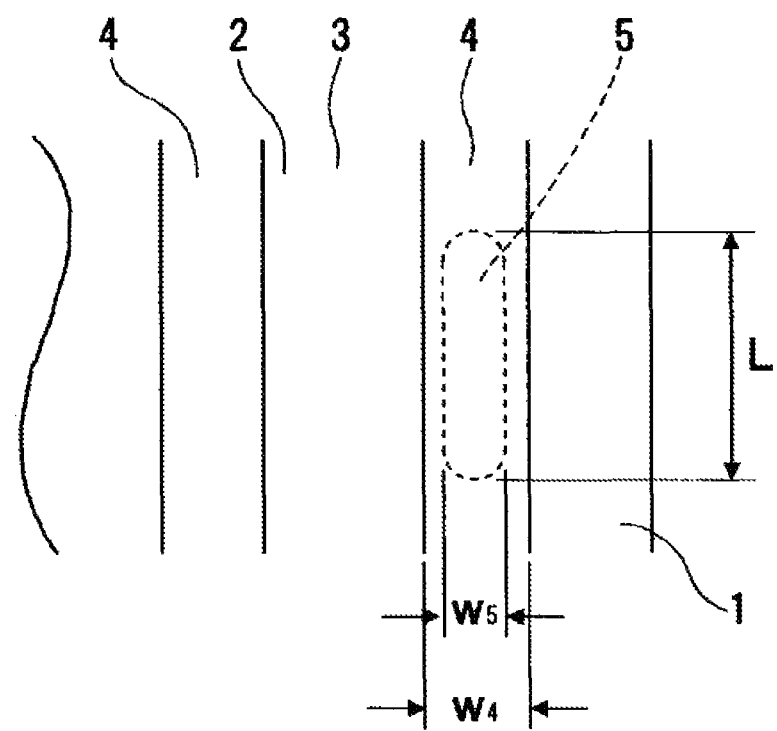
FIG. 1B is a top view of the section of the fuel cell constituent part shown in FIG. 1A.

FIG. 1 shows the fuel cell constituent part relating to the First Practical Example of the present invention. Further, FIG. 2 shows the manufacturing method thereof.

The fuel cell constituent part relating to said practical example comprises both the top and bottom faces of plate attachment part 1, comprising separators, MEA, or resin plates and the like, on which a pair of gaskets 2, 2, comprising rubber-type elastic bodies, are molded in one piece. The gaskets 2, 2 comprise layout on the flat face of plate 1, surrounding the power generation area of the fuel cell or the fluid manifold. In the cross-sectional view in FIG. 1A, the lengthwise direction of the gasket extends in the direction orthogonal to the paper face; in the top view in FIG. 1B, the lengthwise direction extends in the up-and-down direction. Furthermore, the pair of gaskets 2, 2 mutually face each other from the top and the bottom, and are integrated with the seal lip 3, having a cross-sectional mound shape and extending in the lengthwise direction of the gasket, and the flat side section 4, located on both sides or on one side of seal lip 3 (on both sides in the figure), and at the same time, being lower in height to seal lip 3.

On the other hand, plate 1, at the location where the member side sections 4, 4 of the pair of gaskets 2, 2 connect through, has a through-hole 5 that penetrates in the thickness direction; one pair of gaskets 2, 2 are mutually molded in one piece through this through-hole 5. A plurality of through-holes 5 are provided with spacing along the lengthwise direction of gasket 2.

Further, in said practical example, in particular, in order to make the width of the side section 4 as small as possible, the opening shape of through-hole 5 is set in a long shape in the lengthwise direction of the gasket; in concrete terms, the lengthwise direction of the gasket is set by the elliptical shape (oval shape) that has the long axis positioned in the lengthwise direction of the gasket. In conjunction with this, the width w4 of the side section 4 is set to have the same width (short axis) w5 as this through-hole 5, or otherwise, is set to be slightly larger than the width (short axis) w5 of through-hole 5 (w4≥w5). Consequently, in the conventional comparison to the case where the opening shape was circular, because the width (short axis) w5 of the elliptical through-hole 5 is set to be smaller than the width (diameter) of the circular through-hole, the width w4 of the side section 4 can be set to be smaller than what it was heretofore. (For example, when the width (diameter) of the circular through-hole is 0.8 mm, it is necessary to set the width w4 of the side section 4 to be 0.8 mm or greater. In contrast to this, when the width (short axis) w5 of the elliptical through-hole 5 is halved to 0.4 mm, the width w4 of the side section 4 can be set to be 0.4 mm or greater, but less than 0.8 mm, the width w4 of the side section 4 can be set to be smaller than what it was heretofore.) Moreover, the width (short axis) of the elliptical through-hole 5 is set to be not greater than the width w4 of the side section 4, but the length (long axis) L of the elliptical through-hole 5 is set to be larger than the width w4 of the side section 4.

Figure 2A:
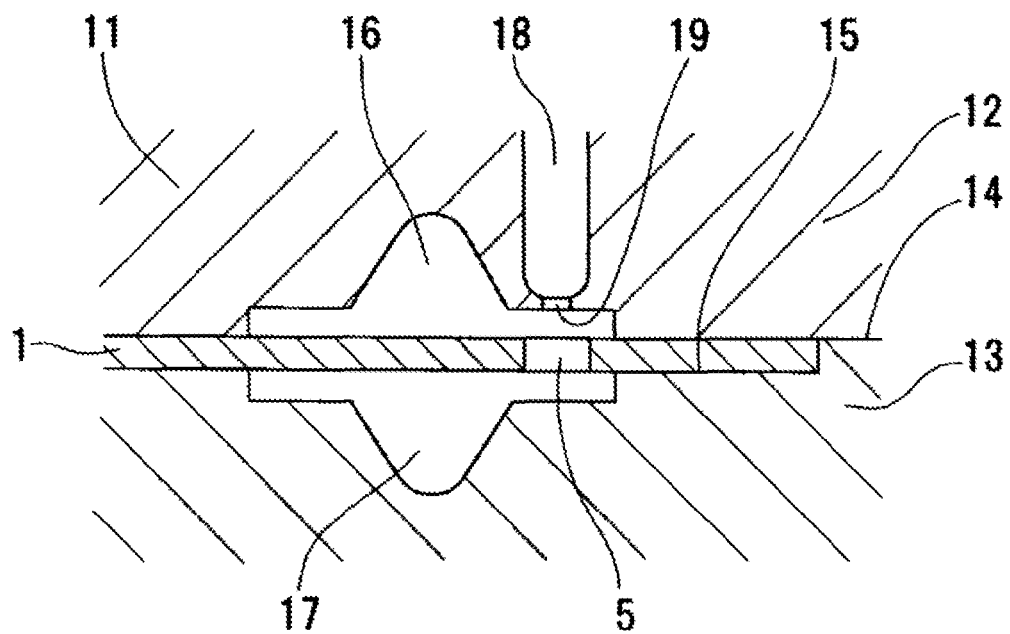
FIG. 2A shows a cross-sectional view of a section of the metal mold for the manufacturing method for the same fuel cell constituent part.

As shown in FIG. 2A, the aforementioned gasket 2 is molded in the metal mold 11 by injection molding; the metal mold 11 has as one piece, the space 15 for setting the plate on the parting section 14 for the plurality of partition molds 12, 13, and space 16 for molding one of the gaskets 2, and space 17 for molding the other gasket 2.

Figure 2B:
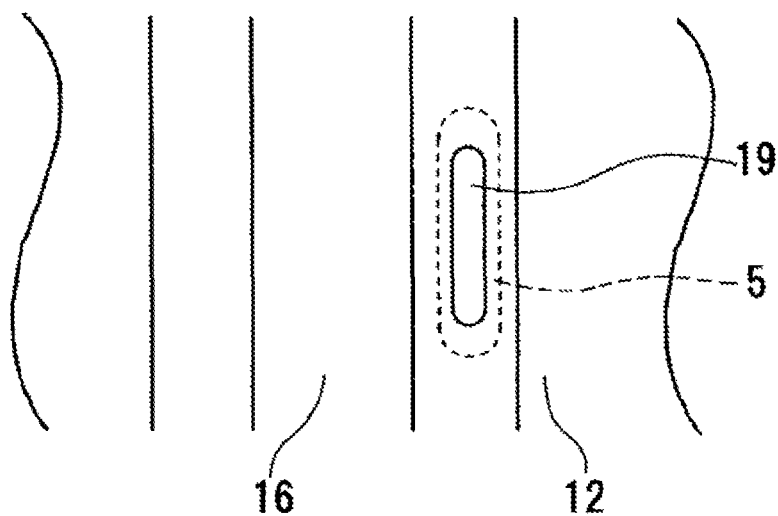
FIG. 2B is a diagram showing the opening shape of the input gate of the mold of FIG. 2A.

On the other hand, input gate 18 for the molding material has its opening on the inside face of the space 16 for molding one of the gaskets 2. As shown in FIG. 2B, the opening section 19 of this input gate 18 is located in the position directly on top of the through-hole 5 on plate 1 that is in a set state in space 15 and the flat face. Moreover, the opening shape of the input gate is set in a long shape in the lengthwise direction of the gasket as in the case of through-hole 5; in concrete terms, it is set in an elliptical shape (oval shape) where the long axis is positioned in the lengthwise direction of the gasket, and is set to have an elliptical shape (oval shape) somewhat smaller than the opening shape of through-hole 5. Consequently, because the opening shape of the input gate is not crowded out at all on the flat face from the opening shape of through-hole 5, by maintaining the opening area of the input gate 18, it becomes possible to suppress the deformation of the periphery section of through-hole 5 on plate 1 from the effects of injection pressure at the time of molding.

Figure 3A:
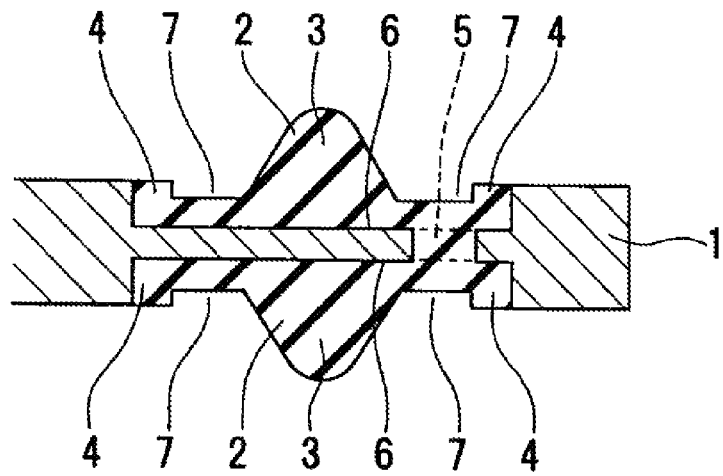
FIG. 3A shows a cross-sectional view of a section of the fuel cell constituent part relating to the Second Practical Example of the present invention.
Figure 3B:
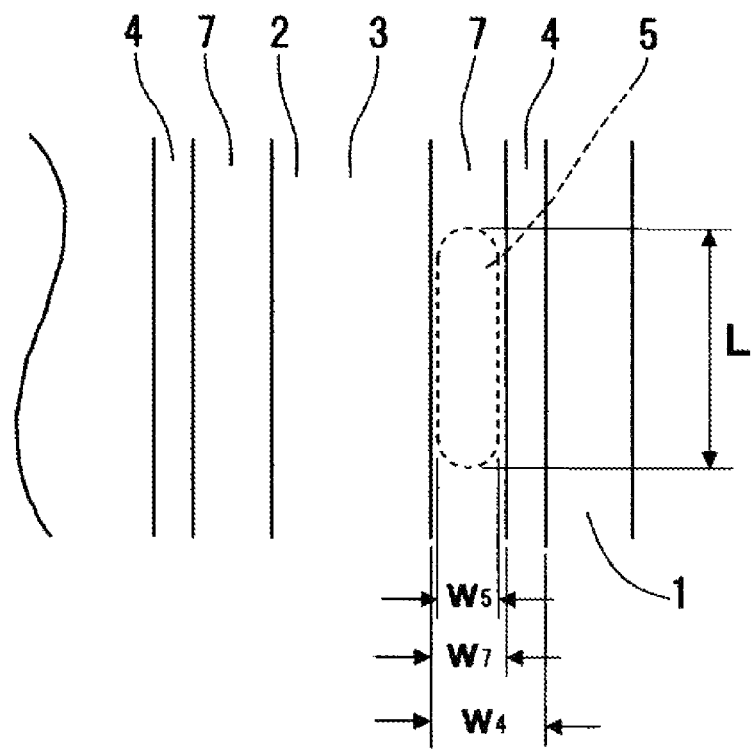
FIG. 3B is a top view of the section of the fuel cell constituent part shown in FIG. 3A.

FIG. 3 shows the fuel cell constituent part relating to the Second Practical Example of the present invention. Further, FIG. 4 shows the manufacturing method thereof.

The fuel cell constituent part relating to said practical example is provided with gasket attachment groove 6, corresponding to both the top and bottom faces of plate attachment part 1, comprising separators, etc. In this attachment groove 6, a pair of gaskets 2, 2, comprising rubber-type elastic bodies, are molded in one piece. The attachment groove 6 and the gaskets 2, 2 comprise layout on the flat face of plate 1, surrounding the power generation area of the fuel cell or the fluid manifold. In the cross-sectional view in FIG. 3A, the lengthwise direction of the gasket extends in the direction orthogonal to the paper face; in the top view in FIG. 3B, the lengthwise direction extends in the up-and-down direction. Furthermore, the pair of gaskets 2, 2 mutually face each other from the top and the bottom, and are integrated with the seal lip 3, having a cross-sectional mound shape and extending in the lengthwise direction of the gasket, and the flat side section 4, located on both sides or on one side of seal lip 3 (on both sides in the figure), and at the same time, being lower in height to seal lip 3. Moreover, groove depression 7 that extends in the lengthwise direction of the gasket is provided on the flat face of the side section 4.

On the other hand, plate 1, in the bottom section of the attachment groove 6, at the location where the member side sections 4, 4 of the pair of gaskets 2, 2 connect through, has a through-hole 5 that penetrates in the thickness direction; one pair of gaskets 2, 2 are mutually molded in one piece through this through-hole 5. A plurality of through-holes 5 are provided with spacing along the lengthwise direction of gasket 2.

Further, in said practical example, in particular, in order to make the width of one of the side sections 4 as small as possible, the opening shape of the through-hole 5 is set in a long shape in the lengthwise direction of the gasket; in concrete terms, is set in an elliptical shape (oval shape) that has the long axis set in the lengthwise direction of the gasket. In conjunction with this, the width w4 of the side section 4 is set to be the same as the width (short axis) w5 of this through-hole 5, or otherwise, is set to be somewhat larger than the width (short axis) w5 of through-hole 5 (w4≥w5). Consequently, in the conventional comparison to the case where the opening shape is circular, because the width (short axis) w5 of the elliptical through-hole 5 is set to be smaller than the width (diameter) of the circular through-hole, the width w4 of the side section 4 can be set to be smaller than what it was heretofore. Moreover, the width (short axis) of the elliptical through-hole 5 is set to be not greater than the width w4 of the side section 4, but the length (long axis) L of the elliptical through-hole 5 is set to be greater than the width w4 of the side section 4. Moreover, the elliptical through-hole 5 is located in the position directly on top of the groove depression 7, provided on top of the flat face on the side section 4, and the flat face; furthermore, the width (short axis) w5 of the through-hole 5 is set to be not greater than the width w7 of the groove depression 7.

Figure 4A:
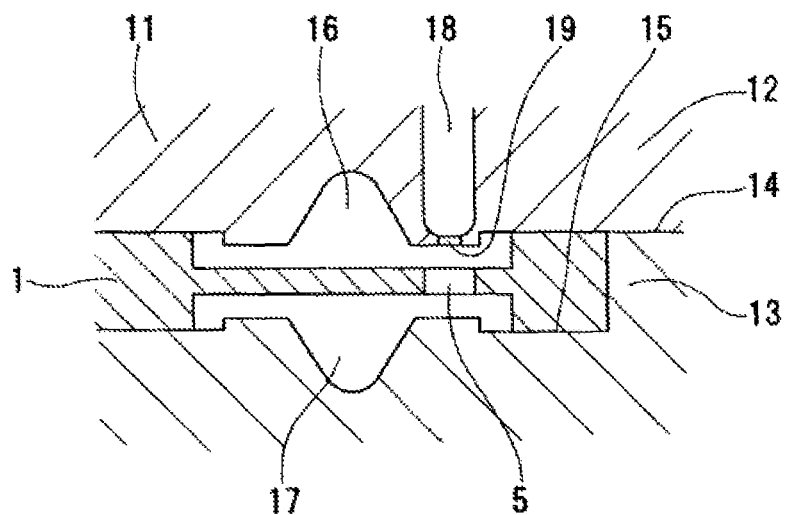
FIG. 4A shows a cross-sectional view of a section of the metal mold for the manufacturing method for the fuel cell constituent part shown in FIG. 3A.

As shown in FIG. 4A, the aforementioned gasket 2 is molded in the metal mold 11 by injection molding; the metal mold 11 includes as one entity, the space 15 for setting the plate on the parting section 14 for the plurality of partition molds 12, 13, and space 16 for molding one of the gaskets 2, and space 17 for molding the other gasket 2.

Figure 4B:
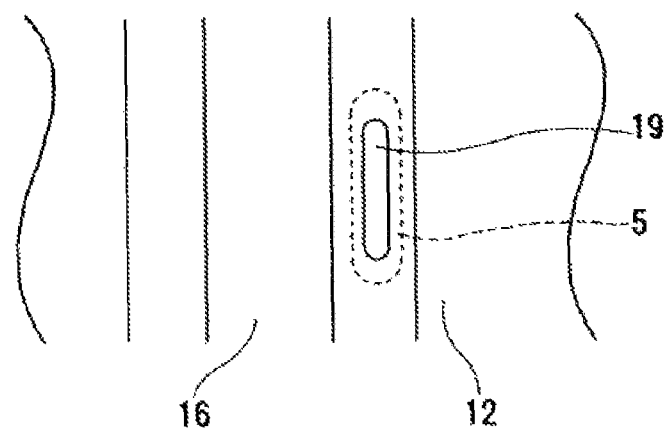
FIG. 4B is a diagram showing the opening shape of the input gates of the mold of FIG. 4A.
Figure 6:
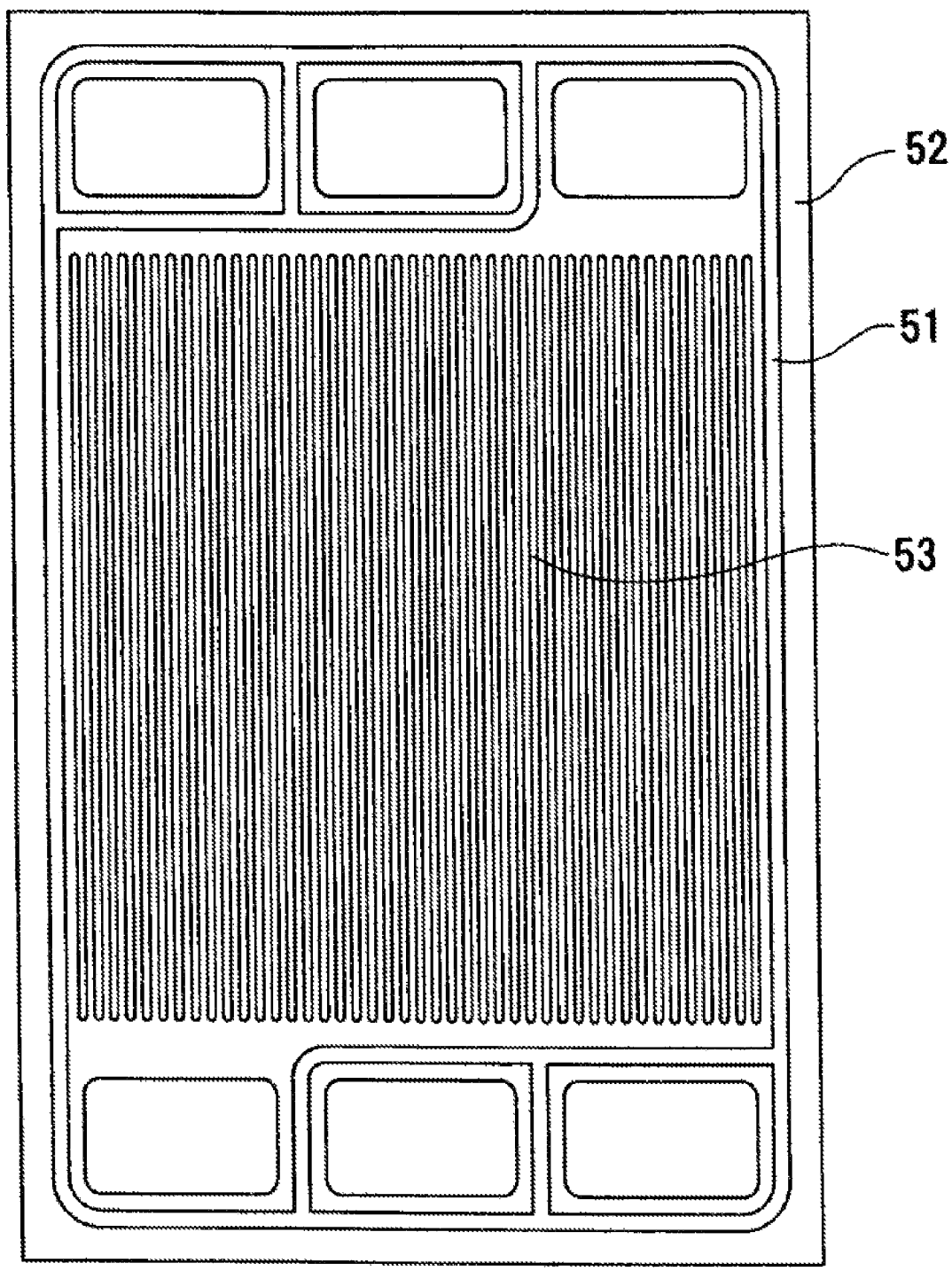
FIG. 6 is a top view of the general structure of the fuel cell constituent part.
Figure 7A:
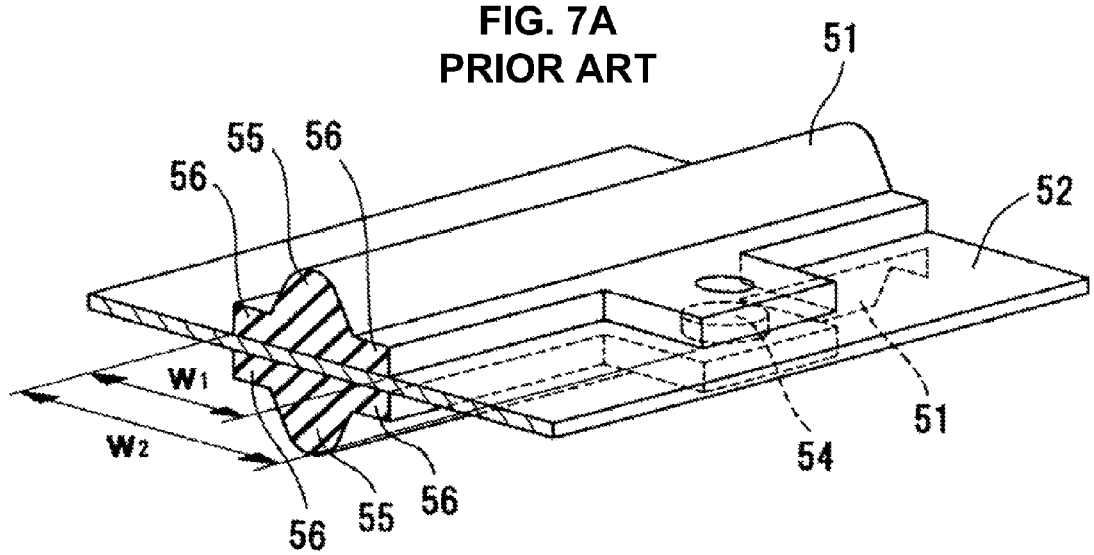
FIG. 7A is a perspective view of a conventional fuel cell constituent part.
Figure 7B:
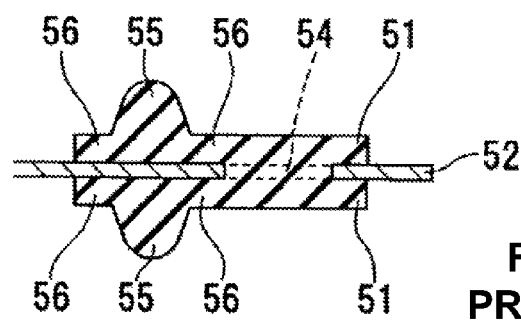
FIG. 7B is cross-sectional view of the essential sections of the fuel cell constituent part shown in FIG. 7A.
Figure 7C:
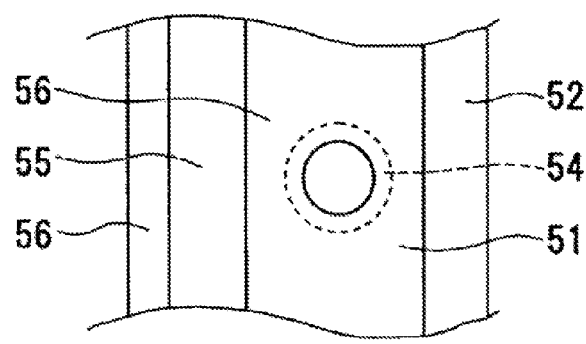
FIG. 7C is a top view of the essential sections of the constituent part shown in FIG. 7A.

Furthermore, the input gate 18 for the molding material has its opening on the inside face of the space 16 for molding one of the gaskets 2. As shown in FIG. 4B, the opening section 19 of this input gate 18 is located in the space 15 in the position directly on top of the through-hole 5 on plate 1 that is in a set state, and the flat face. Moreover, the opening shape of the input gate 18 is set in a long shape in the lengthwise direction of the gasket as in the case of through-hole 5; in concrete terms, it is set in an elliptical shape (oval shape) where the long axis is positioned in the lengthwise direction of the gasket, and is set to have an elliptical shape (oval shape) somewhat smaller than the opening shape of the through-hole 5. Consequently, because the opening shape of the input gate 18 is not crowded out at all on the flat face from the opening shape of the through-hole 5, by maintaining the opening area of the input gate 18, it becomes possible to suppress the deformation of the periphery section of through-hole 5 on plate 1 from the effects of injection pressure at the time of molding.

FIG. 5 shows the fuel cell constituent part relating to the Third Practical Example of the present invention.

The fuel cell constituent part relating to said practical example comprises the plate attachment part 1, comprising separators, MEA, and resin plates, etc., wherein a pair of gaskets 2, 2, comprising rubber-type elastic bodies, are molded in one piece on both the top and bottom faces. The gaskets 2, 2 comprise layout on the flat face of plate 1, surrounding the power generation area of the fuel cell or the fluid manifold. In the cross-sectional view in FIG. 5B, the lengthwise direction of the gasket extends in the direction orthogonal to the paper face; in the top view in FIG. 5C, the lengthwise direction extends in the up-and-down direction. Furthermore, the pair of gaskets 2, 2 mutually face each other from the top and the bottom, and are integrated with the seal lip 3, having a cross-sectional mound shape and extending in the lengthwise direction of the gasket, and the flat side section 4, located on both sides or on one side of seal lip 3 (on both sides in the figure), and at the same time, being lower in height to seal lip 3. Moreover, in one section in the lengthwise direction of the gasket, on one of the side sections 4, the width expansion section (also termed tongue section) 8 is provided, that protrudes in a tongue-shape to expand the width of the side section 4.

On the other hand, plate 1, at the location where the member side sections 4, 4 of the pair of gaskets 2, 2 connect through, has the through-hole 5 that penetrates in the thickness direction; one pair of gaskets 2, 2 are mutually molded in one piece through this through-hole 5. A plurality of through-holes 5 are provided with spacing along the lengthwise direction of gasket 2.

Further, in said practical example, in particular, in order to locate through-hole 5 at the position on top of width expansion section 8 and the flat face, and at the same time, to make the width of one of the side sections 4, provided with this width expansion section 8, as small as possible, the opening shape of through-hole 5 is set in a long shape in the lengthwise direction of the gasket; in concrete terms, it is set in an elliptical shape (oval shape) that has the long axis positioned in the lengthwise direction of the gasket. In conjunction with this, the width w4 of one of the side sections 4, containing the width expansion section 8, is set to have the same width (short axis) w5 as this through-hole 5, or otherwise, is set to have width larger than the width (short axis) w5 of through-hole 5 (w4≥w5). Consequently, in the conventional comparison to the case where the opening shape is circular, because the width (short axis) w5 of the elliptical through-hole 5 is set to be smaller than the width (diameter) of the circular through-hole, the width w4 of the side section 4 can be set to be smaller than what it was heretofore. Moreover, the width (short axis) w5 of the elliptical through-hole 5 is set to be not greater than the width w4 of the side section 4 containing the width expansion section 8, but the length (long axis) L of the elliptical through-hole 5 is set to be greater than the width w4 of one of the side sections 4, containing the width expansion section 8.

Furthermore, although not pictured, the opening section 19 (only this opening section 19 is shown in FIG. 5), in the metal mold for molding the aforementioned gasket 2, is located in the position directly on top of the through-hole 5 on plate 1 in a set state, and the flat face. Moreover, the opening shape of the input gate is set in a long shape in the lengthwise direction of the gasket as in the case of through-hole 5; in concrete terms, it is set in an elliptical shape (oval shape) where the long axis is positioned in the lengthwise direction of the gasket, and is set to have an elliptical shape (oval shape) somewhat smaller than the opening shape of through-hole 5. Consequently, because the opening shape of the input gate is not crowded out at all on the flat face from the opening shape of through-hole 5, by maintaining the opening area of the input gate, it becomes possible to suppress the deformation of the periphery section of through-hole 5 on plate 1 from the effects of injection pressure at the time of molding.

Moreover, the structure of said Third Practical Example is particularly effective when the width w44 of the side section 4 that does not contain the width expansion section 8 is to be set extremely small.

1 Plate attachment part
    3 Gasket
    3 Seal lip
    4 Side section
    5 Through-hole
    6 Gasket attachment groove
    7 Groove depression
    8 Width expansion section
    11 Metal mold
    12, 13 Partition mold
    14 Parting section
    15, 16, 17 Space
    18 Input gate
    19 Opening section The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A fuel cell constituting component comprising:
 a plate-shaped attachment member; and
 a pair of gaskets which is integrally formed with both surfaces of the plate-shaped attachment member,
 wherein the pair of gaskets is integrally formed with seal lips corresponding to each other and extending in the longitudinal direction of the pair of gaskets, and side portions disposed on either sides or one side of the seal lip and having a height lower than that of the seal lip,
 wherein the plate-shaped attachment member includes a through-hole provided at a position where the side portions of the pair of gaskets communicate with each other so as to be formed therethrough in the thickness direction, and the pair of gaskets is integrally formed as a unitary member through the through-hole and
 wherein an opening shape of the through-hole is set to be an elongated shape in the longitudinal direction of the pair of gaskets so as to make a width dimension of each of the side portions as small as possible.

2. The fuel cell constituting component as claimed in claim 1,
 wherein the side portion of the pair of gaskets, is provided with a groove-shaped concave portion extending in the longitudinal direction of the pair of gaskets, in a plane.

3. The fuel cell constituting component as claimed in claim 1,
 wherein in the side portion of the gasket, a part of the pair of gaskets, in the longitudinal direction is provided with a tongue-piece shaped width dimension enlarging portion enlarging a width dimension of the side portion, and the through-hole is disposed at a position overlapping with the width dimension enlarging portion in a plane.

\* \* \* \* \*